United States Patent [19]

Whitlock, III

[11] 4,391,499

[45] Jul. 5, 1983

[54] IMAGE PROJECTOR

[76] Inventor: William C. Whitlock, III, 1119 Grayland St., Greensboro, N.C. 27408

[21] Appl. No.: 356,235

[22] Filed: Mar. 8, 1982

[51] Int. Cl.³ .............................................. G03B 21/00
[52] U.S. Cl. ..................................... 353/122; 353/10; 350/144
[58] Field of Search ................... 353/10, 121, 122, 34, 353/7; 350/144, 130, 291; 362/32; 40/427, 452

[56] References Cited

U.S. PATENT DOCUMENTS

| 720,877 | 2/1903 | Block | 350/291 |
|---|---|---|---|
| 1,719,518 | 7/1929 | Nissen et al. | 350/291 X |
| 3,217,594 | 11/1965 | Simmon | 88/24 |
| 3,604,780 | 9/1971 | Martin | 353/10 X |
| 3,944,336 | 3/1976 | Carr, Jr. | 350/291 X |
| 3,989,862 | 11/1976 | Farnum | 352/69 |
| 4,057,338 | 11/1977 | Yevick | 350/96 R |
| 4,078,860 | 3/1978 | Globus et al. | 352/156 |
| 4,090,104 | 5/1978 | Vann et al. | 313/475 |
| 4,101,188 | 7/1978 | Yevick | 350/167 |
| 4,173,391 | 11/1979 | Schure et al. | 350/130 X |

Primary Examiner—Stephen Marcus
Assistant Examiner—William R. Sharp

[57] ABSTRACT

The image projector as disclosed herein demonstrates an apparatus and method for creating a three-dimensional image. The projector is composed of a plurality of modules which are controllably illuminated to form the desired display. The modules are formed to be illuminated and to pass light from within through their walls and to prevent light from entering their outer walls when said modules are not illuminated.

18 Claims, 5 Drawing Figures

IMAGE PROJECTOR

BACKGROUND AND OBJECTIVES OF THE INVENTION

Various attempts have been made in the past to form three-dimensional objects for viewing including the presentation of motion pictures which utilized the aid of polarized eyeglasses. More recently hologram technology has developed whereby a three-dimensional image can be produced and be used in certain instances where cost is not a prohibiting factor. In any event, a simple, easy to operate, three-dimensional projector has not been produced which is affordable for the average consumer and it was with this background in mind that the present invention was developed.

It is therefore an objective of the present invention to provide a three-dimensional image projector which is relatively low in cost and is easy to operate.

It is another objective of the present invention to provide a three-dimensional image projector which has a durable construction by virtue of its simplicity of design.

It is still another objective of the present invention to provide a three-dimensional image projector which can be adapted to a variety of image input means.

It is yet another objective of the present invention to provide a three-dimensional image projector which has a viewing means adaptable to a variety of shapes depending on its particular use.

It is also an objective of the present invention to provide a three-dimensional image projector which presents an image which can be easily changed and which said image is presented with a minimum of distortion.

SUMMARY OF THE PREFERRED EMBODIMENTS OF THE INVENTION

The apparatus of the preferred embodiment of the invention comprises an image projector having an input means, transmission means and variety means. The input means includes an energy source such as a high intensity light, a control means which may consist of a coded pattern on film, a drive means, and a grid means which contains the input portions of the transmission means. The preferred embodiment includes a transmission means consisting of optical fibers which receive light at the grid means and transmit it to the viewing means which is comprised of a plurality of rows and columns of modules. The modules are constructed having walls of a unidirectional light transmitting material such as aluminized polyester film. As selected modules are illuminated, particular forms appear in the viewing means depending upon the particular modules illuminated and the intensity of the light transmitted to each module.

In the preferred method of the invention, a three-dimensional object is formed by providing a plurality of three-dimensional modules having walls constructed of an aluminized polyester film. Certain of said modules are selectively illuminated by transmitting light from a light source through a preselected coded pattern. Light passing through said selected pattern is then delivered to the respective module by the attached optical fibers. The outer surface of the image being viewed is the light reflected from the non-illuminated modules which are mirror-like. The modules directly adjacent to the non-illuminated modules are lighted with the color of light to be the selected color of the object's surface. All the modules which are to be transparent, are lighted with white light.

DESCRIPTION OF THE DRAWINGS

Turning now to the drawings.

Figure 1:
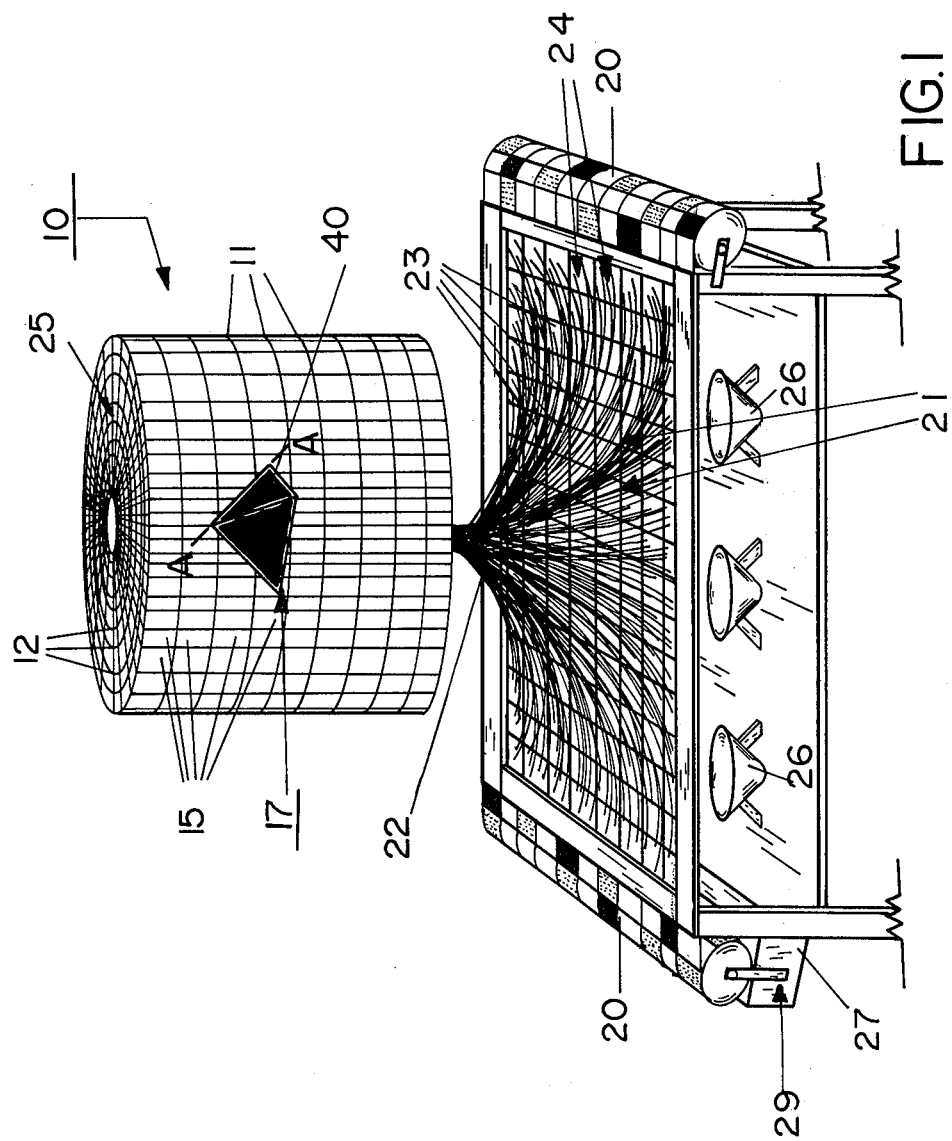
FIG. 1 illustrates a perspective view of the invention.
Figure 4:
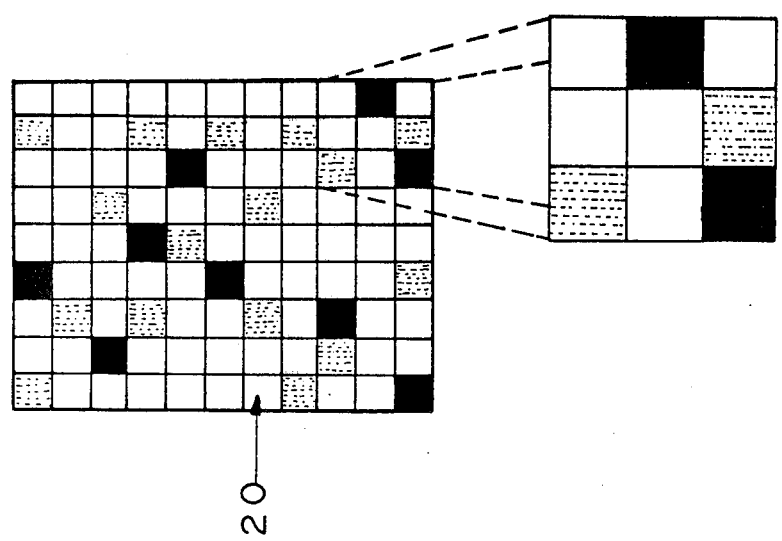
FIG. 4 demonstrates an enlarged portion of the coded patterns.
Figure 3:
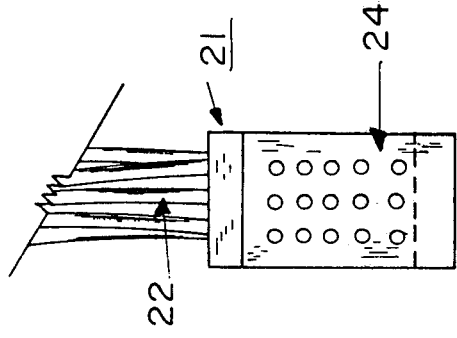
FIG. 3 illustrates the input portion of a bundle of optical fibers made of glass or polymers of the transmission means.
Figure 2:
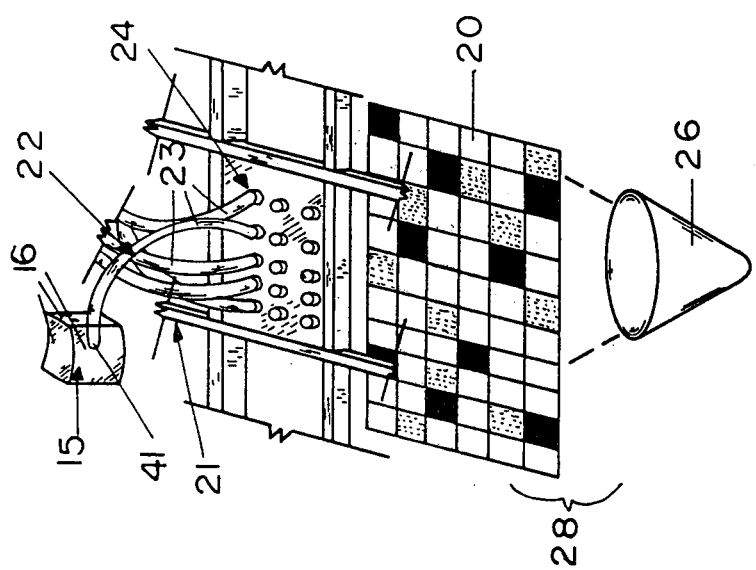
FIG. 2 shows in schematic fashion a substantially cubically shaped module, transmission and input means.

The method of the present invention comprises directing light rays from an energy source such as a high intensity lamp to the coded pattern 20 as shown in FIG. 1. The coded pattern may be a film material having a series of light and dark areas which may allow light to pass through completely, partially, or not at all as shown in more detail in FIG. 4. Light which passes through coded pattern 20 then enters transmission means 21 which comprises a series of fiber bundles 22 as shown in FIG. 2. Fiber bundles 22 are in turn comprised of individual optical fibers 23 as are conventionally known and which form an input portion 24 of transmission means 21 as shown in FIG. 3.

Light energy presented to transmission input means 24 passes along individual fibers 23 for illuminating modules 15 to which they are attached. By providing light of varying intensities to particular modules 15, images can be formed by this method which have three dimensions.

As further shown in FIG. 1, three-dimensional projector 10 includes viewing means 25 which comprises a plurality of rows 11, horizontally aligned and columns 12, vertically aligned of modules 15 which consist of small cubicals formed by the intersecting vertical and horizontal walls. Modules 15 may be substantially cubically shaped as shown in FIG. 2 or may have other geometrical configurations as desired. Modules 15 have air within walls 16 but may be constructed to have fluids such as particular gases contained therein or may be constructed with a vacuum therein.

The walls 16 of modules 15 as shown in FIG. 2 are formed of a unidirectional light-transmitting material such as an aluminized polyester film which is commercially available from a number of sources. Material of this nature is commonly used as a solar insulating film for office buildings or the like and the thickness of the film and aluminum coating can be varied as required for particular circumstances. While it is understood by those skilled in the art that light will pass through the film from either direction, unidirectional as used herein means that the majority of light will pass outwardly from a module 15 which is internally illuminated through its walls 16 but said light will be reflected as it strikes the outer walls of a module which has not been illuminated. Light will pass completely through modules which are illuminated within. Thus, as shown in FIG. 1, the pyramidal form or image 17 shown in viewing means 25 is formed by a plurality of unlit modules 40 whereas the surrounding modules are illuminated for contrast. As would be further understood the amount of illumination provided to each module can be varied and also various colored lights or color coded patterns can be provided whereby the optical fibers 23 may carry light of many desired colors or intensities. The terminal ends 41 of the fibers within modules 15 may be modified or formed to adjust the light which flows therethrough and a phosphorus or other coating may be used to enhance the light energy within the module.

Figure 5:
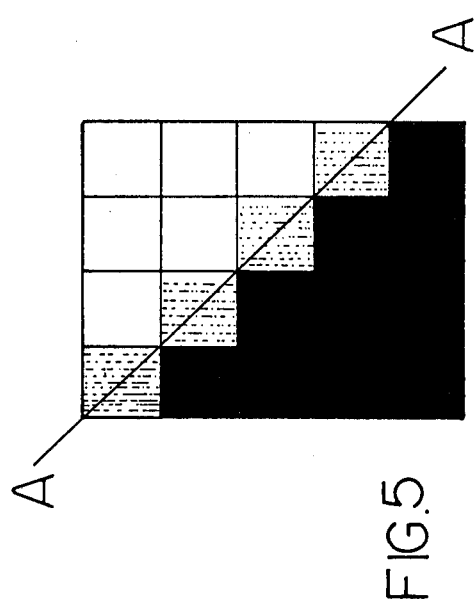
FIG. 5 demonstrates in 2-dimensional form an enlarged section of the image shown in the viewing means.

As shown in FIG. 5, the configuration of the outer surface of pyramidal form 17 may in fact be a series of "stairsteps" which would appear as a straight line when viewed from a distance. This stairstep effect may be lessened slightly by partially illuminating the adjacent modules to reduce the contrast to the viewer.

As demonstrated in FIG. 2, each module 15 has an optical fiber 23 which terminates within. Optical fibers 23 may be of suitable size depending on the particular requirements and the current availability and sizes may vary from 1 to 5 mils from a number of commercial sources.

Viewing means 25 is depicted in FIG. 1 as having a substantially cylindrical configuration but may also be made to have a spherical, cubical or dome-like appearance. Also, a projector of the present invention may be constructed in a panoramic fashion, i.e., so formed with the viewer being inside the projector and having side and top walls composed of the illuminatable modules shaped much like the shell of a planetarium.

Optical fibers 23 descend from individual modules 15 and intertwine into a series of bundles 22 and form transmission input portions 24 shown in FIG. 3. The input portions 24 of transmission means 21 are arranged in a grid-like manner above coded pattern 20 as shown in FIG. 1.

Input means 28 of projector 10 comprises an energy source 26 which may consist of a single high intensity light or series of lights which are directed upwardly as shown in FIG. 1 and control means 29 which may comprise a coded pattern or film 20. Light passes through control means 29 to input portion 24 of transmission means 21. Control means 29 as shown in FIG. 1 consists of coded film 20 and drive means 27 which, as shown, is a motorized reel. As coded pattern 20 moves along its path, from right to left as shown in FIG. 1 the image seen in viewing means 25 changes. Coded pattern 20 is shown in more detail in FIG. 4 and may consist of clear, dark, half-tone or gray areas or may be colored as required for particular images.

The input means 28 as shown in FIG. 2 may be replaced, for example, with a video screen whereby a pattern transmitted by the video screen could be translated into a three-dimensional object by viewing means 25. It should be understood that a two-dimensional object as shown on a television screen could not, without additional translation, be formed into a three-dimensional object by the present invention. However by translating a particular object such as a tree, into a particular coded pattern, the coded pattern could then be utilized to form a three-dimensional image of a tree and shown by viewing means 25.

Transmission means 21 as shown herein includes a series of optical fibers 23, however it is anticipated that electrical conductors or wireless conductors could be utilized to deliver energy to selected modules 15. Also, energy sources other than the high intensity lights 26 as shown in FIG. 1 could be used to deliver energy to optical fibers 23.

Various modifications and changes can be made to the present invention and the examples and illustrations as shown therein are for illustrative purposes and are not intended to limit the scope of the claims.

I claim:

1. An image projector for displaying three-dimensional forms comprising: a plurality of three-dimensional modules, at least one of said modules aligned in each of the three-dimensional directions relative to the other of said modules, said modules being constructed of unidirectional light-transmitting material, illuminating means, said illuminating means being positioned within said modules, transmission means, said transmission means for directing energy to said illuminating means, and energy input means, said energy input means communicating with said transmission means whereby illuminating certain of said modules provides a three-dimensional form.

2. An image projector as claimed in claim 1 wherein said energy input means comprises control means, said control means for selectively directing energy to said transmission means.

3. An image projector as claimed in claim 2 wherein said control means includes a coded pattern.

4. An image projector as claimed in claim 3 wherein said coded pattern comprises a film means.

5. An image projector as claimed in claim 2 wherein said energy input means includes an energy source, said energy source communicating with said control means.

6. An image projector as claimed in claim 5 wherein said energy source includes a light means.

7. An image projector as claimed in claim 1 wherein said unidirectional light-transmission material comprises an aluminized film.

8. An image projector as claimed in claim 7 wherein said aluminized film comprises an aluminized polyester film.

9. An image projector as claimed in claim 1 wherein said illuminating means comprises the terminal end of an optical fiber.

10. An image projector as claimed in claim 2 wherein said control means includes a video screen means.

11. An image projector as claimed in claim 1 wherein said transmission means includes an optical fiber.

12. An image projector for displaying three-dimensional forms comprising: a plurality of three-dimensional modules, at least one of said modules being aligned in each of the three-dimensional directions relative to the other of said modules, said modules being constructed of unidirectional light-transmitting material, said light-transmitting material comprising an aluminized film, illuminating means, said illuminating means consisting of the terminal end of an optical fiber, transmission means, said transmission means for directing light to an illuminating means, said transmission means consisting of an optical fiber, an input means, said input means including a control means and an energy source, said control means consisting of a coded pattern, and said energy source consisting of a light source.

13. A method of forming a three-dimensional image comprising the steps of: providing a plurality of three-dimensional modules having at least one module aligned in each of the three-dimensional directions relative to the other of said modules, said modules having walls constructed of unidirectional light-transmitting material and selectively illuminating certain of said modules to thereby form a three-dimensional image.

14. A method as claimed in claim 13 wherein providing a plurality of three-dimensional modules comprises providing a plurality of cubically shaped modules.

15. A method of forming a three-dimensional image as claimed in claim 14 wherein providing a plurality of cubically shaped modules includes providing a plurality of cubically shaped modules having all six walls constructed of unidirectional light-transmitting material.

16. A method of forming a three-dimensional image as claimed in claim 13 wherein selectively illuminating certain of said modules includes the step of transmitting light to certain of said selected modules through optical fibers.

17. A method of forming a three-dimensional image as claimed in claim 13 wherein selectively illuminating certain of said modules includes providing image input means for communication with said modules.

18. A method forming a three-dimensional image comprising the steps of: providing a plurality of three-dimensional modules having walls constructed of an aluminized film, and having at least one module aligned in each of the three-dimensional directions relative to the other of said modules, and selectively illuminating certain of said modules by transmitting light from a light source through a coded pattern to optical fibers communicating with certain of said three-dimensional modules.

* * * * *

UNITED STATES PATENT AND TRADEMARK OFFICE
CERTIFICATE OF CORRECTION

PATENT NO. : 4,391,499

DATED : July 5, 1983

INVENTOR(S) : William C. Whitlock

It is certified that error appears in the above-identified patent and that said Letters Patent is hereby corrected as shown below:

On the title page, under References Cited, "3,989,862

11/1976 Farnum....352/69" should read

-- 3,989,362 11/1976 Farnum................352/69 --.

Column 1, line 41, "variety means" should read -- viewing means --.

Column 6, line 5, after "method" insert -- of --.

Signed and Sealed this

Third Day of January 1984

[SEAL]

Attest:

GERALD J. MOSSINGHOFF

Attesting Officer     Commissioner of Patents and Trademarks